Figure 1:
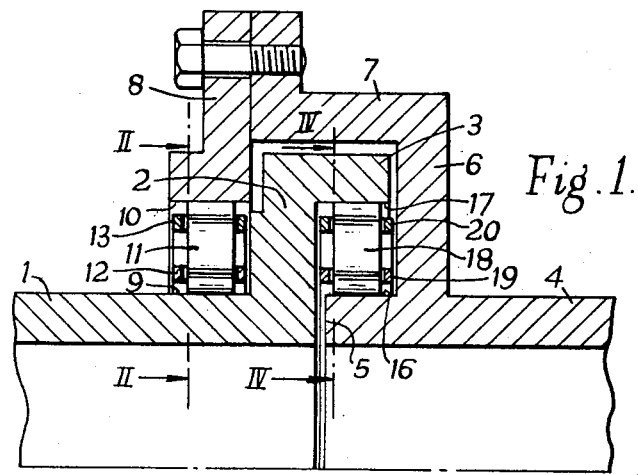

Jan. 12, 1965  H. A. CLEMENTS  3,165,183
CLUTCHES FOR TRANSMITTING ROTARY MOTION
Filed Jan. 9, 1962  2 Sheets-Sheet 1

INVENTOR
HERBERT ARTHUR CLEMENTS
BY
Benjamin Sweedler
ATTORNEY

INVENTOR
HERBERT ARTHUR CLEMENTS
BY
Benjamin Sweedler
ATTORNEY

United States Patent Office 3,165,183
Patented Jan. 12, 1965

3,165,183
CLUTCHES FOR TRANSMITTING ROTARY MOTION
Herbert Arthur Clements, Weybridge, England, assignor to S.S.S. Patents Limited, London, England, a British company
Filed Jan. 9, 1962, Ser. No. 165,106
Claims priority, application Great Britain, Jan. 12, 1961, 1,400/61
2 Claims. (Cl. 192—103)

This invention relates to unidirectional clutches for transmitting rotary motion, the clutches being of the type comprising a plurality of sprag elements arranged between inner and outer coaxial races carried by the respective rotary clutch parts. The sprags are shaped so as to permit relative rotation of the clutch parts in one direction, but when the direction of relative rotation tends to reverse the sprags wedge between the races and torque is transmitted through them from one clutch part to the other.

It is known to arrange the weight distribution of the individual sprags such that under the action of centrifugal force they come out of contact with the inner race above a predetermined value of the angular speed of the outer race, when the latter is over-running the inner race spring means being provided for urging the sprags into contact with the inner race when the angular speed of the outer race falls below the said value. With such an arrangement, however, the clutch cannot be re-engaged so long as the outer race continues to rotate at a speed higher than the said value. An object of the invention is to remedy this defect.

In accordance with the invention a clutch comprises coaxially mounted first and second rotary clutch parts, a first set of sprags positioned between the rotary clutch parts, first spring means urging the sprags into contact with both clutch parts, the first sprags tending to rotate with the second rotary clutch part and having weight distributions such that they disengage from the first rotary clutch part when the second rotary clutch part over-runs the first rotary clutch part and is rotating at above a predetermined speed, a second set of sprags positioned between the first and second rotary clutch parts, and second spring means urging the second sprags out of contact with the second rotary clutch part, the second sprags tending to rotate with the first rotary clutch part and having weight distributions such that at above a predetermined speed of the first rotary clutch part they move into positions in which they make contact with both rotary clutch parts.

With an arrangement in accordance with the invention, if with the clutch initially at rest the first clutch part is set in rotation in the torque-transmitting direction, the tendency for the first clutch part to rotate relatively to the second clutch part causes the first set of sprags, which are urged by spring means into engagement with both their races, to become wedged between these races so that the clutch is engaged and the rotary motion of the first clutch part is imparted to the second clutch part. The sprags of the second set are urged by the second spring means out of engagement with the second clutch part during the initial stage of acceleration of the first clutch part. As the second clutch part approaches full speed, the sprags of the second set are urged by centrifugal force into engagement with the second clutch part.

So long as torque is being transmitted from the first clutch part to the second clutch part the first set of sprags continues to be in engagement with both the first and the second clutch parts. If now the first clutch part is decelerated, the second clutch part over-runs it and the sprags of the first set disengage from the first clutch part under the action of centrifugal force which overcomes the action of the springs acting on these sprags. The sprags of the second set will at first be in over-running engagement with the second clutch part but, as the speed of the first clutch part falls, the action of centrifugal force tending to engage the second sprags with the second clutch part decreases and eventually the second sprags are turned by their spring means out of engagement with the second clutch part. With the first clutch part stationary or rotating only slowly, and the second clutch part rotating e.g. at high speed (being for example driven by another means) none of the sprags of either the first or the second set is in contact with both clutch parts and there is no wear on the sprags.

If the input shaft is accelerated again, at a predetermined speed the second sprags will be turned by centrifugal force into over-running engagement with the second clutch part so as to be effective to engage the clutch when the first clutch part reaches synchronism with the second clutch part.

Figure 6:
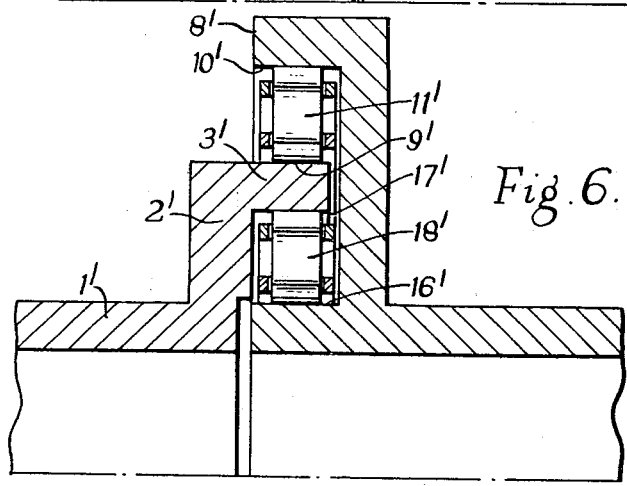
Figure 7:
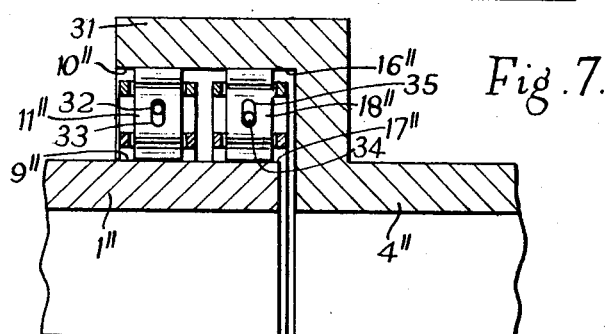
Figure 2:
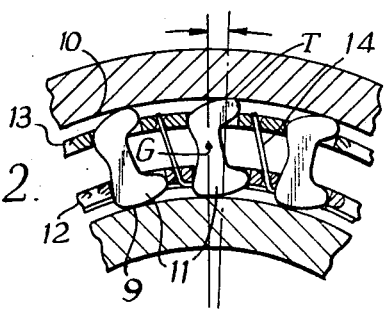
Figure 3:
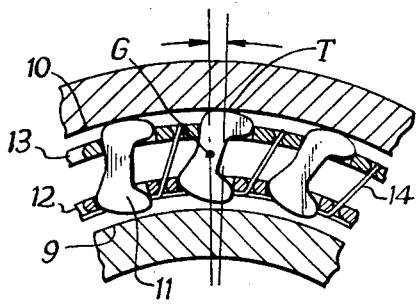
Figure 4:
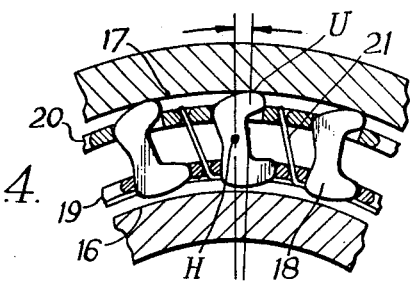
Figure 5:
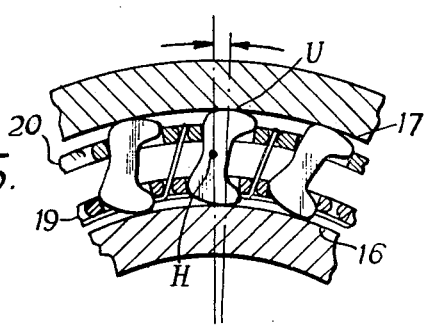

Embodiments of the invention will now be described by way of example with reference to the accompanying drawings, in which:

FIG. 1 is a longitudinal sectional view of one embodiment,

FIGS. 2 and 3 are fragmentary cross-section views on the line II—II of FIG. 1, showing the sprags of the first set in their engaged and disengaged conditions respectively, FIGS. 4 and 5 are fragmenary cross-sectional views on the line IV—IV of FIG. 1, showing the sprags of the second set in their disengaged and engaged conditions respectively, and FIGS. 6 and 7 are longitudinal sectional views of two other embodiments.

In the embodiment of the invention shown in FIGS. 1 to 5, the first clutch part is formed by an input shaft 1 with a radial flange 2 on one end and a cylindrical part 3 projecting from the periphery of the flange so as to overhang the end of the shaft 1. The second clutch part is formed by an output shaft 4 journalled coaxially with the input shaft 1 with its end 5 near to the radial flange 2 on the input shaft 1, the output shaft carries a radial flange 6 spaced from the end 5 and a cylindrical part 7 projecting from the periphery of the radial flange 6 and around and slightly beyond the cylindrical part 3 projecting from the radial flange of the input shaft 1. A ring 8 bolted to the end of the cylindrical projection 7 projects towards the input shaft by the side of, but spaced from, the radial flange 2 on the input shaft.

The outer surface of the input shaft adjacent the radial flange 2 and the radially inner surface of the ring 8 constitute or are formed respectively as an inner race 9 and an outer race 10 for a ring of uniformly spaced sprags 11, constituting the above-mentioned first set of sprags, the ends of which project through apertures in two coaxial cylindrical cages 12, 13 arranged between the races. The sprags 11 are of asymmetrical shape and the weight distribution thereof is such that with the outer race 10 rotating clockwise (FIG. 3), centrifugal force causes the outer ends of the sprags to engage and rotate with the outer race and also tends to twist the sprags out of engagement with the inner race, since the centre of gravity G of each sprag lies to the left of the axial plane through the line of contact T of the sprag with the outer race 10. The sprags thus tend to move under the action of centrifugal force from the condition shown in FIG. 2 to that shown in FIG. 3. Spring means tend to keep the sprags 11 engaged with the inner race 9, the spring means in this embodiment comprise cantilever springs 14 having their inner and outer ends fixed in the inner and outer cages 12 and 13. The cantilever springs 14 urge the outer cage 13 anti-clockwise relative to the inner cage 12 to the position shown in FIG. 2. In another embodiment (not shown) helical compression springs are located between abutments on cages to urge the sprags in the required directions.

The outer surface of the output shaft on the side of the radial flange 6 thereon nearest the input shaft 1, and the radially inner surface of the cylindrical part 3 carried by the radial flange 2 on the input shaft, constitute or are formed respectively as an inner race 16 and an outer race 17 for a ring of uniformly spaced sprags 18 which constitute the above-mentioned second set. The sprags 18 are located in inner and outer cages 19 and 20. The inner cage 19 is resiliently urged clockwise relative to the outer cage 20 to the condition shown in FIG. 4 by cantilever springs 21 which have their inner and outer ends fixed respectively in the inner and outer cages 19 and 20.

The weight distribution of the sprags 18 is such that with their outer race 17 rotating in the clockwise direction as seen in FIG. 4, the effect of centrifugal force on the sprags is both to cause them to press at their outer ends against their outer race 17 and rotate therewith and, since the centre of gravity H of each sprag lies to the left (FIG. 4) of the axial plane through the line of contact U between the sprag and the outer race 17, to tend to roll the sprags clockwise on the outer race 17 thereby twisting them to the condition shown in FIG. 5 against the action of the springs 21.

In operation, with the input and output shafts 1 and 4 stationary, the first sprags 11 are urged by their spring means 14 into engagement with their inner and outer races 9 and 10 as shown in FIG. 2 so that, when the input shaft 1 is accelerated in the clockwise direction, torque is transmitted through them to the output shaft 4. The second sprags 18 are urged by centrifugal force into engagement with their outer race 17 and are held by their spring means 21 out of engagement with their inner race 16. As the input shaft accelerates, at a predetermined speed the action of centrifugal force on the second sprags 18 twists them against the action of their spring means 21 into engagement with their inner race 16 as shown in FIG. 5 but no torque is transmitted through them, the output shaft being accelerated up to full speed by the transmission of torque through the sprags 11 of the first set.

If now the input shaft 1 is decelerated, leaving the output shaft to continue to run, being now driven for example by another means, both sets of sprags will continue to be pressed against and rotate with their outer races, and the first sprags 11 will now come out of contact with their inner race 9, the action of centrifugal force on them due to their weight distribution causing them to twist clockwise against the action of their spring means, as shown in FIG. 3. The second sprags 18 will trail on their inner race 16 until, at a predetermined angular speed of the input shaft and hence of the outer race 17 the springs 21 overcome the twisting action of centrifugal force on the sprags 18 and moves them out of contact with their inner race 16. Below the said speed down to zero speed of the input shaft both rings of sprags are out of contact with their inner races.

If now the input shaft 1 is accelerated again, at a predetermined angular speed thereof the action of centrifugal force on the second sprags 18 twists them into contact with their inner race, and they trail relatively to it until the input shaft reaches synchronism with the output shaft, whereupon driving torque is transmitted from the input shaft to the output shaft via the second sprags 18. The first sprags 11 remain out of contact with their inner race 9 and do not come into contact with it unless the angular speed of the output shaft 4, and hence of their outer race 10, should fall to a predetermined value.

If desired it may be arranged that the angular speed of the output shaft when decelerating at which the first sprags come into contact with their inner race is above the speed at which the second sprags engage their inner race when the input shaft is accelerated, so as to ensure that at least one ring of sprags is effective to cause clutch engagement throughout the whole angular speed range of the output shaft. If engagement at only two speeds is required, viz. zero speed and maximum speed, such overlap is not necessary provided that the first sprags are effective when starting from rest and the second sprags are effective at maximum speed.

In the above-described embodiment of the invention the first and second rings of sprags are side by side in the axial direction of the clutch and are on the same radius. In another embodiment of the invention shown in FIG. 6 the two rings of sprags 11' and 18' are in substantially the same radial plane referred to the clutch axis, with the second ring of sprags 18' radially inside the first ring. The input shaft 1' has a radial flange 2' on one end, with a cylindrical part 3' projecting from the periphery of the radial flange 2', the inner surface of the cylindrical part forming an outer race 17' for the second set of sprags 18' and its outer surface forming an inner race 9' for the first set of sprags 11'. The inner race 16' for the second ring of sprags 18' is on the end of the output shaft adjacent the input shaft, and the outer race for the first ring of sprags is formed by the radially inner surface 10' of a cylindrical part 8' which projects towards the input shaft from the periphery of a radial flange on the output shaft. The operation is the same as in the case of the first embodiment described above.

In the embodiment shown in FIG. 7, both sets of sprags 11''' and 18''' are positioned between one end of the input shaft 1'' and a bell-shaped extension 31 of the output shaft 4'' which overhangs the end of the input shaft.

The inner surface of the bell 31 constitutes one race 10'' and 16'' for the two sets of sprags while the other races 9'' and 17'' for the sprags are formed by the cylindrical outer surface of the input shaft.

A toroidal compression spring 32 located in radial slots 33 in each sprag 11'' urges the sprags 11'' radially outwards to rotate with the bell 31 while simultaneously twisting them into engagement with the input shaft 1''.

As the speed of the output shaft increases, the sprags 11'' tend to move outwards away from the input shaft 1''.

A toroidal tension spring 34 located in slots 35 in the sprag 18'' of the second set urges the sprags 18 into contact with the input shaft 1'' so as to rotate therewith and at the same time tends to twist them out of contact with the bell 31. However increasing centrifugal force as the input shaft speed increases moves the sprags 18'' into contact with the bell 31 at a predetermined speed.

The operation of the clutch is otherwise the same as that of the embodiment shown in FIGS. 1 to 5.

I claim:

1. A clutch comprising a first rotary clutch part, a second rotary clutch part, a set of first sprags, spring means urging said first sprags into operative positions for the transmission of torque from said first clutch part to said second clutch part, said first sprags having a weight distribution such that under the action of centrifugal force they assume inoperative positions when the said second clutch part over-runs said first clutch part at a speed higher than a predetermined speed, a set of second sprags, spring means urging said second sprags into inoperative positions, said second sprags having a weight distribution such that when said first clutch part rotates at a speed above a predetermined speed said second sprags assume positions in which they are capable of transmitting torque from said first clutch part to said second clutch part when said first clutch part tends to overtake said second clutch part.

2. A clutch according to claim 1 in which the said sprags are constructed and arranged to ensure that the predetermined speed of the second clutch part above which said first sprags become inoperative is above the predetermined speed of said first clutch part above which said second sprags assume positions in which they are capable of transmitting torque.

References Cited in the file of this patent

UNITED STATES PATENTS

| | | | |
|---|---|---|---|
| 1,870,649 | Rawson | | Aug. 9, 1932 |
| 2,398,087 | Dodge | | Aug. 9, 1946 |

FOREIGN PATENTS

| | | | |
|---|---|---|---|
| 1,152,446 | France | | Sept. 2, 1957 |
| 1,225,441 | France | | Feb. 15, 1960 |